United States Patent
Mertel et al.

(10) Patent No.: US 12,049,239 B2
(45) Date of Patent: Jul. 30, 2024

(54) DISTRIBUTED COMPUTING NETWORK COMPRISED OF AUTONOMOUS VEHICLES CARRYING LIQUID IMMERSION COOLING PLATFORMS

(71) Applicant: MODINE LLC, Racine, WI (US)

(72) Inventors: Jacob Mertel, Plano, TX (US); John David Enright, Plano, TX (US); Taylor Monning, Plano, TX (US)

(73) Assignee: MODINE LLC, Racine, WI (US)

(*) Notice: Subject to any disclaimer, the term of this patent is extended or adjusted under 35 U.S.C. 154(b) by 0 days.

(21) Appl. No.: 17/986,400

(22) Filed: Nov. 14, 2022

(65) Prior Publication Data
US 2023/0150546 A1    May 18, 2023

Related U.S. Application Data

(60) Provisional application No. 63/297,156, filed on Jan. 6, 2022, provisional application No. 63/278,598, filed on Nov. 12, 2021.

(51) Int. Cl.
*B60W 60/00* (2020.01)
*B60P 3/00* (2006.01)

(52) U.S. Cl.
CPC .......... *B60W 60/0025* (2020.02); *B60P 3/00* (2013.01); *B60W 2556/45* (2020.02)

(58) Field of Classification Search
None
See application file for complete search history.

(56) References Cited

U.S. PATENT DOCUMENTS

| | | |
|---|---|---|
| 7,213,391 B2 | 5/2007 | Jones |
| 7,885,070 B2 | 2/2011 | Campbell et al. |
| 7,957,145 B2 | 6/2011 | Suzuki et al. |
| 7,961,475 B2 | 6/2011 | Campbell et al. |
| 8,009,419 B2 | 8/2011 | Attlesey et al. |
| 8,014,150 B2 | 9/2011 | Campbell et al. |
| 8,089,765 B2 | 1/2012 | Attlesey |
| 8,194,406 B2 | 6/2012 | Campbell et al. |
| 8,351,206 B2 | 1/2013 | Campbell et al. |
| 8,490,418 B2 | 7/2013 | Weber et al. |
| 8,711,565 B2 | 4/2014 | Wagoner et al. |

(Continued)

FOREIGN PATENT DOCUMENTS

| | | |
|---|---|---|
| WO | 2019138176 A1 | 7/2019 |
| WO | 2020225649 A1 | 11/2020 |

(Continued)

*Primary Examiner* — James J Lee
*Assistant Examiner* — David Hatch
(74) *Attorney, Agent, or Firm* — Michael Best & Friedrich LLP

(57) ABSTRACT

An interconnected network including a plurality of autonomous vehicles is described. Each autonomous vehicle can include an immersion cooling system. The network can include a central server for determining whether there has been any network disruption. In the event of the network disruption (or when a network disruption is predicted), the central server can deploy at least one vehicle to the area to maintain the network connectivity. Upon receiving the instructions, the vehicle can drive to the area. The central server can use an artificial intelligence algorithm to make the prediction.

9 Claims, 4 Drawing Sheets

(56) References Cited

U.S. PATENT DOCUMENTS

| | | |
|---|---|---|
| 8,867,209 B2 | 10/2014 | Campbell et al. |
| 8,941,994 B2 | 1/2015 | Campbell et al. |
| 8,947,873 B2 | 2/2015 | Campbell et al. |
| 8,953,317 B2 | 2/2015 | Campbell et al. |
| 8,953,320 B2 | 2/2015 | Campbell et al. |
| 8,964,391 B2 | 2/2015 | Campbell et al. |
| 8,966,922 B2 | 3/2015 | Campbell et al. |
| 8,976,526 B2 | 3/2015 | Kulkarni et al. |
| 9,049,800 B2 | 6/2015 | Shelnutt et al. |
| 9,095,942 B2 | 8/2015 | Campbell et al. |
| 9,101,078 B2 | 8/2015 | Campbell et al. |
| 9,144,179 B2 | 9/2015 | Shelnutt et al. |
| 9,153,374 B2 | 10/2015 | Kulkarni et al. |
| 9,178,400 B2 | 11/2015 | Pal et al. |
| 9,195,282 B2 | 11/2015 | Shelnutt et al. |
| 9,223,360 B2 | 12/2015 | Attlesey et al. |
| 9,261,308 B2 | 2/2016 | Campbell et al. |
| 9,282,678 B2 | 3/2016 | Campbell et al. |
| 9,313,920 B2 | 4/2016 | Campbell et al. |
| 9,328,964 B2 | 5/2016 | Shelnutt et al. |
| 9,332,674 B2 | 5/2016 | Campbell et al. |
| 9,351,429 B2 | 5/2016 | Shelnutt et al. |
| 9,357,675 B2 | 5/2016 | Campbell et al. |
| 9,414,520 B2 | 8/2016 | Campbell et al. |
| 9,433,132 B2 | 8/2016 | Krishnan et al. |
| 9,516,792 B2 | 12/2016 | Krishnan et al. |
| 9,543,787 B2 | 1/2017 | Scrutiny |
| 9,596,787 B1 | 3/2017 | Iyengar et al. |
| 9,622,379 B1 | 4/2017 | Campbell et al. |
| 9,655,279 B2 | 5/2017 | Pelletier et al. |
| 9,713,290 B2 | 7/2017 | James et al. |
| 9,773,526 B2 | 9/2017 | Shelnutt et al. |
| 9,904,811 B2 | 2/2018 | Campbell et al. |
| 9,912,021 B2 | 3/2018 | Andres |
| 9,913,402 B2 | 3/2018 | Shafer et al. |
| 9,918,408 B2 | 3/2018 | Regimbal et al. |
| 9,921,622 B2 | 3/2018 | Shelnutt et al. |
| 9,974,212 B2 | 5/2018 | Ichinose et al. |
| 9,992,914 B2 | 6/2018 | Best et al. |
| 10,015,905 B2 | 7/2018 | Watanabe et al. |
| 10,018,425 B2 | 7/2018 | Shelnutt et al. |
| 10,020,242 B2 | 7/2018 | Katsumata et al. |
| 10,028,409 B1 | 7/2018 | Metzler et al. |
| 10,070,558 B2 | 9/2018 | Campbell et al. |
| 10,098,260 B2 | 10/2018 | Bouras et al. |
| 10,104,814 B2 | 10/2018 | Wagoner et al. |
| 10,130,008 B2 | 11/2018 | Shepard et al. |
| 10,149,408 B2 | 12/2018 | Fujiwara et al. |
| 10,206,307 B2 | 2/2019 | Lau |
| 10,206,308 B2 | 2/2019 | Meijer et al. |
| 10,257,960 B1 | 4/2019 | Banerjee et al. |
| 10,314,199 B2 * | 6/2019 | Smith, III ............... H01L 23/44 |
| 10,321,603 B1 | 6/2019 | Banerjee et al. |
| 10,485,137 B2 | 11/2019 | Helsel et al. |
| 10,512,192 B2 | 12/2019 | Miyoshi |
| 10,568,236 B2 | 2/2020 | Tian et al. |
| 10,609,839 B1 | 3/2020 | Archer et al. |
| 10,617,032 B1 * | 4/2020 | Enright .................. B25J 18/002 |
| 10,765,033 B1 | 9/2020 | Keehn et al. |
| 10,966,349 B1 | 3/2021 | Lau |
| 11,012,873 B1 * | 5/2021 | Mondragon ........... G06N 3/044 |
| 11,076,508 B2 | 7/2021 | Gao |
| 11,116,113 B2 | 9/2021 | Chiu et al. |
| 2018/0220307 A1 * | 8/2018 | Mohammed .......... H04W 16/26 |
| 2019/0267683 A1 | 8/2019 | Shepard et al. |
| 2019/0357378 A1 | 11/2019 | Kolar et al. |
| 2020/0113083 A1 | 4/2020 | Schon et al. |
| 2020/0178414 A1 | 6/2020 | Bulinski et al. |
| 2020/0386488 A1 | 12/2020 | Smith et al. |
| 2021/0018356 A1 | 1/2021 | Bean, Jr. et al. |
| 2021/0059079 A1 | 2/2021 | Keehn et al. |
| 2021/0075863 A1 * | 3/2021 | Achillopoulos ... G07C 9/00182 |
| 2021/0084790 A1 | 3/2021 | Sachdev et al. |
| 2021/0180874 A1 | 6/2021 | Eadelson |

FOREIGN PATENT DOCUMENTS

| | | |
|---|---|---|
| WO | 2021111296 A1 | 6/2021 |
| WO | 2019155179 A1 | 8/2022 |

* cited by examiner

DISTRIBUTED COMPUTING NETWORK COMPRISED OF AUTONOMOUS VEHICLES CARRYING LIQUID IMMERSION COOLING PLATFORMS

CROSS-REFERENCE TO RELATED APPLICATIONS

This application is related to PCT publication WO2020/102090 filed Nov. 11, 2019 titled "Liquid Immersion Cooling Platform" owned by TMGCore, LLC which application is incorporated herein by reference. This application also claims the benefit of U.S. Patent Application Ser. No. 63/297,156, filed on Jan. 6, 2022 and U.S. Patent Application Ser. No. 63/278,598 filed on Nov. 12, 2021

FIELD OF DISCLOSURE

The present disclosure relates to a liquid immersion cooling system adapted to supply compute and processing services to a de-centralized network, for example, a de-centralized cloud computing network.

BACKGROUND

Traditional computing and/or server systems utilize air to cool the various components of these systems. Traditional liquid or water cooled computers utilize a flowing liquid to draw heat from computer components but avoid direct contact between the computer components and the liquid itself. The development of electrically non-conductive and/or dielectric fluid enables the use of immersion cooling in which computer components and other electronics may be submerged in a dielectric or electrically non-conductive liquid in order to draw heat directly from the component into the liquid. Immersion cooling can be used to reduce the total energy needed to cool computer components and may also reduce the amount of space and equipment necessary for adequate cooling.

SUMMARY

The liquid immersion cooling systems are being implemented for various computing needs. As such, it is beneficial to describe an immersion cooling system which can be easily adapted for every power, signal, data and fluid input and output hardware specification.

Computing networks that provide cloud processing, virtual servers and compute services tend to be offered by a few entities which possess one or more large processing warehouses that include thousands of servers. Each entity controls one or more of these processing warehouses, which may be located in various geographical areas. However, the warehouses governed by one entity are not connected to the warehouses controlled by another entity. As such, a consumer's processing need can only be addressed by one entity. Moreover, the services offered by each entity can be susceptible to entity-wide attacks, challenges and problems.

These warehouses can be scaled only if the entity governing the data center desires to build up its capabilities. Also, there remains cost barriers for smaller entities who desire to enter into this market. Moreover, because the consumers are tied to one of few entities offering these services, there is benefit in providing a network that includes a plurality of warehouses, each warehouse being controlled by an independent service provider. Furthermore, a computer network supported by these processing warehouses can be susceptible to connectivity disruption or an external attack. For example, in the event of flooding or a missile attack, cable connections supporting the network can be severed, thereby the network can go down.

Accordingly, it is an object of the present disclosure to provide an exemplary distributed network for providing compute services, wherein the network comprises of a plurality of immersion cooling systems. Each immersion cooling system can be controlled by a different entity. In some examples, the immersion cooling system can comprise autonomous vehicles configured to deliver mobile processing units to disrupted areas of the network. As such, the network can be versatile and adaptable. Moreover, because the entities governing each immersion cooling facility may be different, the network's ownership is distributed, and therefore, the network can become a crowdsourced network, wherein each entity can join or depart at any given moment. As such, the exemplary distributed network can be scaled on demand.

There is a need for high capacity computing resources in places where traditional computing and/or server systems cannot be employed efficiently and/or effectively. For example, in the event of a physical disruption of a network, traditional computing and/or server systems cannot support the processing need required by the community. The ability to provide on-site, on-demand computing resources, and the ability to interconnect those computing resources with each other and the broader Internet, or user operated networks, is of important to enabling true computing.

An exemplary mobile system that incorporates all aspects of a data center (power generation, heat rejection, monitoring, management, etc.) and the underlying computing architecture included with a sufficient communications interconnectivity technology can address some of the deficiencies identified above.

Advantageously, the instant application pertains to systems and methods that may allow for high capacity computing resources anywhere such resources are required and may be deployed more quickly than standard fiberoptic based communication systems. In one embodiment the application pertains to a distributed edge computing system comprising a computing element comprising one or more servers. A supporting infrastructure element is configured to provide power to the computing element and cool the computing element. A communications element is operably connected to the computing element and the supporting infrastructure element. A housing at least partially surrounds the at least the computing element and the communications element. The housing can be loaded on an autonomous vehicle. Upon detection of a network disruption, the autonomous vehicles can be deployed automatically to the disrupted areas and provide processing and network capability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

The Immersion Cooling System and Autonomous Vehicle

In one example embodiment, a computing network can include a plurality of immersion cooling systems or vessels. Each vessel can be loaded on an autonomous vehicle configured to transmit and receive signals from a central server. The immersion cooling system or vessel can include a bath area, a sump area, a computing device, a robot, a pressure control system and a management system. The vessel can be a pressure controlled tank maintained at the atmospheric pressure (or within a range thereof) which can be cooled using a heat exchanger. The computing device can be immersed in a dielectric fluid in the bath area of the vessel. The computing device can be connected to a network and perform various processing and computing tasks while immersed in the dielectric fluid. The vessel can include a lid for accessing the bath area, the computing device and the sump area. The vessel can be fluidly coupled to the pressure control system. The robot can lift the computing device from the bath area of the vessel when the lid is open. The robot can place the lifted computing device in a magazine provided for storage of computing devices or on a vehicle. The robot can also lift a computing device from the magazine (or vehicle) and place it in the place of the computing device that was lifted from the bath area. The robot can be affixed to the vessel, the vehicle or another location. In some examples, the vessel can be a single phase liquid immersion cooling system. In other examples, the vessel can be a dual phase liquid immersion cooling system. Yet in other examples, the vessel can be an air cooled system.

Figure 1:
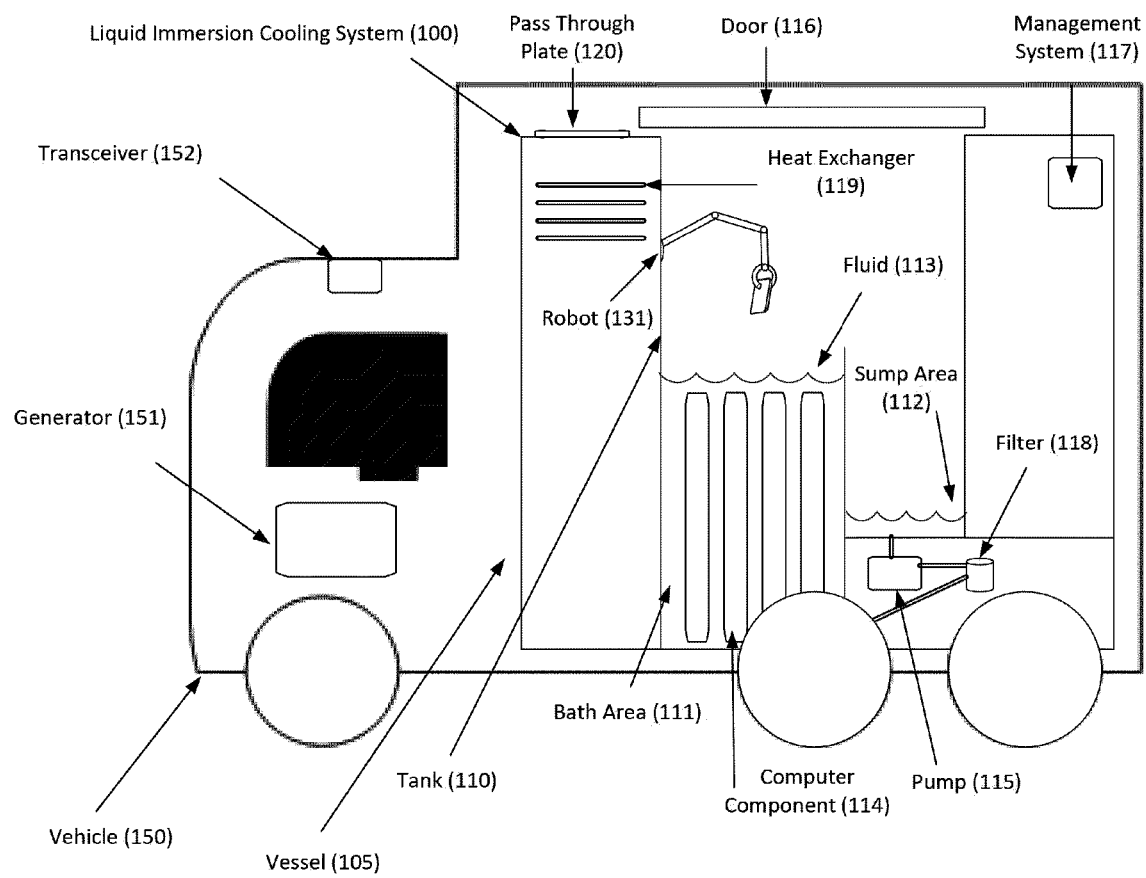
FIG. 1 shows a liquid immersion cooling system 100 loaded onto a vehicle 150 according to an example embodiment of the present disclosure.

FIG. 1 shows a liquid immersion cooling system 100 loaded onto a vehicle 150 according to an example embodiment of the present disclosure. In this example embodiment, the liquid immersion cooling system 100 can include a vessel 105. The vessel 105 can comprise a tank 110, including a bath area 111, a sump area 112, a fluid 113, a computer component 114, a pump 115, a filter 118, a door 116, a management system 117, a heat exchanger 119, a pass through plate 120, and a robot 131. The computer component 114 can be submersed in the fluid 113. In one example, the computer component can include one or more computing devices, such as servers or other purpose-built appliances. The robot 131 can lift the computer component 114 and place the computer component 114 on a desired location.

In one example embodiment, the vehicle 150 can be an autonomous vehicle. The vehicle 150 can receive directions from a central server, and in response, the vehicle 150 can drive itself to the a desired location. In other examples, the vehicle 150 can determine the desired location and drive itself to the location. The vehicle 150 can include a generator 151 and a transceiver 152. The generator 151 can supply power for the operations of the vessel 100. The transceiver 152 can send and receive signals to a network, e.g., Internet network or other network. For example, the vehicle 150 can communicate with the central server using the transceiver 152. In one example, the management system 117 can control the operations of the vehicle 150. In other examples, the vehicle 150 can include a control unit that controls the operations of the vehicle 150.

The Communication System

The exemplary communications system of the exemplary embodiment can include switches, routers, and external connections which are utilized to provide communication capabilities among the vessel, the vehicle, and other components of the network.

The communication system could include of a variety of external communication facilities to provide connectivity between the vehicle, vessel and the network. These facilities include: geostationary satellites; low earth orbit satellites; terrestrial radio-based communications systems such as LTE, 5G, or other directional and non-directional systems; fiberoptic and other communication cabling medium; or a multitude of these communication channels.

The communication system of the exemplary embodiment can be configured in a multitude of ways to support the needs of the users and applications. In some embodiments, it may be configured in a manner similar to how a data center operator would operate their network, providing the servers and other equipment within the vessel a direct pathway for access to the Internet and the ability for external users to connect directly thereto. In other embodiments, it may be configured with differentiated networks for users and different types of servers and applications.

The communication system of the present disclosure can be configured to ensure that some or all of the traffic entering into or exiting the network is routed through a particular internal or external destination. For example, in some embodiments, a security appliance or other gateway may be deployed to allow for encrypted communication between the vessel and one or more external locations. Some or all of the traffic within an embodiment may be configured so that it is routed through such a security appliance so that it may be protected from unauthorized disclosure or modification.

The communication system can be configured to ensure that some or all of the traffic existing in the system is taken through an optimal pathway to the outside world, if there are multiple pathways available. Some embodiments may incorporate load balancing and load sharing technologies to allow for traffic to be routed over multiple communication pathways simultaneously.

The communication system can allow one node to serve as a hub for other nodes. This would allow for a "end node" to be connected to one or more "upstream nodes" and therefore would allow for the operation of a distributed network in a multitude of locations.

The Distributed Network

Figure 2:
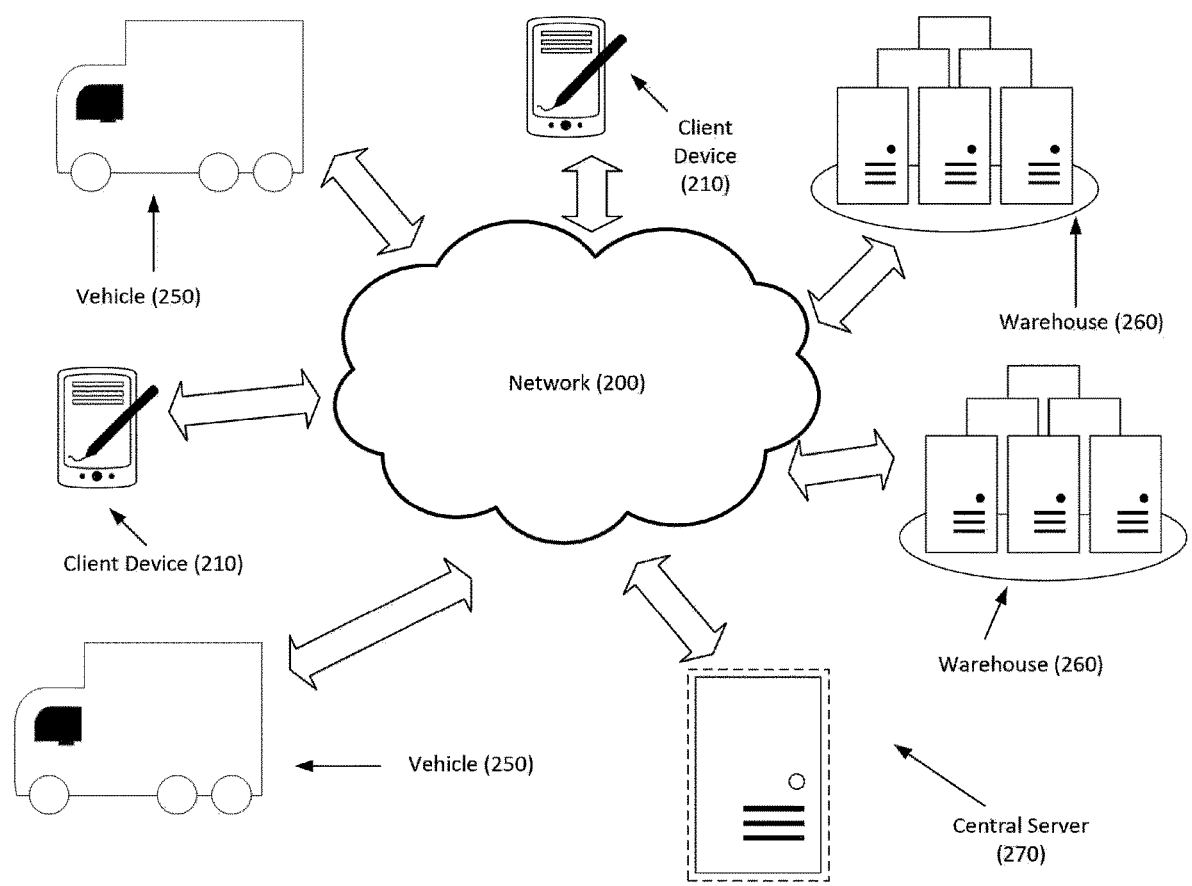
FIG. 2 shows an exemplary network 200 according to an example embodiment of the present disclosure.

In one example embodiment, a distributed network 200 can include a plurality of immersion cooling systems, various warehouses, one or more client devices and at least one central server. FIG. 2 shows an exemplary network 200 according to an example embodiment of the present disclosure. The distributed network (or network) 200 can interconnect the immersion cooling systems 250, warehouses 260, and client devices 210 such that the immersion cooling systems 250 and warehouses 260 can serve the processing needs of the client devices 210 through the network 200. Each immersion cooling system 250 and warehouse 260 can be connected to the network 200 and provide processing services on demand. The warehouses 260 are located at fixed geographical locations, but the vehicle 250 (and the immersion cooling system thereon) can be disconnected as desired and/or moved to another geographical location. In this example embodiment, the network 200 can include a distribution layer, which determines how the data and processing tasks are distributed among the immersion cooling systems 250 and warehouses 260. For example, the distribution layer can be housed on a central server and this layer can route the traffic through specific nodes in the system.

In one example embodiment, each immersion cooling system 250 can publish a price for each unit of processing service. In this example embodiment, the distribution layer can distribute the tasks, e.g., based on the advertised prices.

In one example embodiment, a task can be broken into pieces and the distribution layer can distribute the task among a plurality of entities, each entity processing an aspect of the task. In this example embodiment, the distribution layer can determine how to break the task and how to allocate entities to perform the task.

In one example embodiment, the network 200 can include a central server 270. The central server 270 can detect any disruption in connectivity of one or more areas of the network 200. For example, during a flooding event or a missile attack, the central server 270 can determine whether a particular geographical location has become disconnected from the network 200. The central server 270 can determine the perimeters of the disconnected area. In addition, the central server 270 can determine a strategy for deploying one or more vehicles 250 to the disconnected area to provide network connectivity. For example, the central server 270 can determine specific geographical locations in the disconnected area where the vehicles 250 can be deployed to revive the network 200 in the disconnected area.

In one example, the central server 270 can utilize a variety of factors in determining the deployment strategy (e.g., deciding which vehicles to deploy to which locations within the disrupted geographical area). For example, the central server 270 can select the deployment locations for vehicles 250 based on one or more of the following: availability of power or network interfaces at the deployment location (e.g., whether the vehicle 250 can be plugged in at the deployment location); distance of the deployment location from a designated vehicle to be deployed to the deployment location; desired latency or resource allocation at the deployment location (or at the disrupted network); desired network characteristics at the deployment location; processing and data transmission capabilities of the vehicle.

In one example embodiment, a network 200 covers an area including regions A, B, and C. The central server 270 can determine that there is a network outage at region A, e.g., due to an earthquake. As another example, the central server 270 can determine that there is excessive network traffic at region A. The central server 270 can determine the boundaries of the network outage or traffic. Subsequently, based on the data concerning the performance of the network 200 in the region A prior to the outage (or the traffic data), the central server 270 can determine a network need in region A. The central server 270 can determine the number of available vehicles 250 as well as the capabilities of each vehicle 250. The central server can also determine a few locations within the region A which can provide power and network interface to the vehicles 250. The central server 270 can determine the distance of each vehicle 250 from the locations. Based on this information, the central server 270 can designate one or more of the vehicles 250 to one or more designated locations in the region A to revive the network connectivity or improve the network traffic.

In one example embodiment, the central server uses an algorithm to evenly distribute (with a margin of error) the vehicles within the region A. In one example, the distribution can be weighted. For example, if certain areas within region A require higher network support, the concentration of vehicles within those areas can be higher.

In one example embodiment, the central server 270 can send a signal to each vehicle 250. The signal can inform the vehicle 250 about a location in the region A to which the vehicle A must drive. In response, the vehicle 250 can drive autonomously to the location. Upon arrival, the vehicle 250 can provided processing services to the network in region A. Optionally, the vehicle 250 can be connected to network 200 using an interface or cable connection.

In one example embodiment, the central server can include a machine learning algorithm which predicts the outage areas (or areas to be effected by excess traffic), and deploys the vehicles to the outage areas (or high traffic areas) before the occurrence of the outage (or high traffic). For example, the machine learning algorithm can be trained using past data, e.g., weather data, prior outage data, traffic data, deployment of vehicle data, impact of vehicle deployment on the network performance, etc. Using current data, e.g., weather data or traffic data, the algorithm can predict a disruption.

In one example embodiment, the vehicle is capable of determining the area to which the vehicle should be deployed and drive itself to that area. For example, the vehicle can detect a network disruption or a condition of the network that can be improved by adding the vehicle to the network. Subsequently, the vehicle can drive itself to a location in an impacted area to improve the network conditions. In one optional embodiment, the vehicle can notify the central server before driving to the location. If the central server approves the location, the vehicle can drive to the location. Otherwise, the vehicle selections another location to drive to. In this example, the central server can somewhat control the concentration of vehicles in region A (e.g., prevent two vehicles driving to the same location).

In one example embodiment, the network can include a self-propelled and/or autonomous vehicle; a containerized immersion cooling system; and/or a traditional structure, such as a temporary "hut" or a large existing data center. In one example, the vehicle can include a power generator, a heat rejection system, and a housing for sheltering of the components from the elements.

Figure 3:
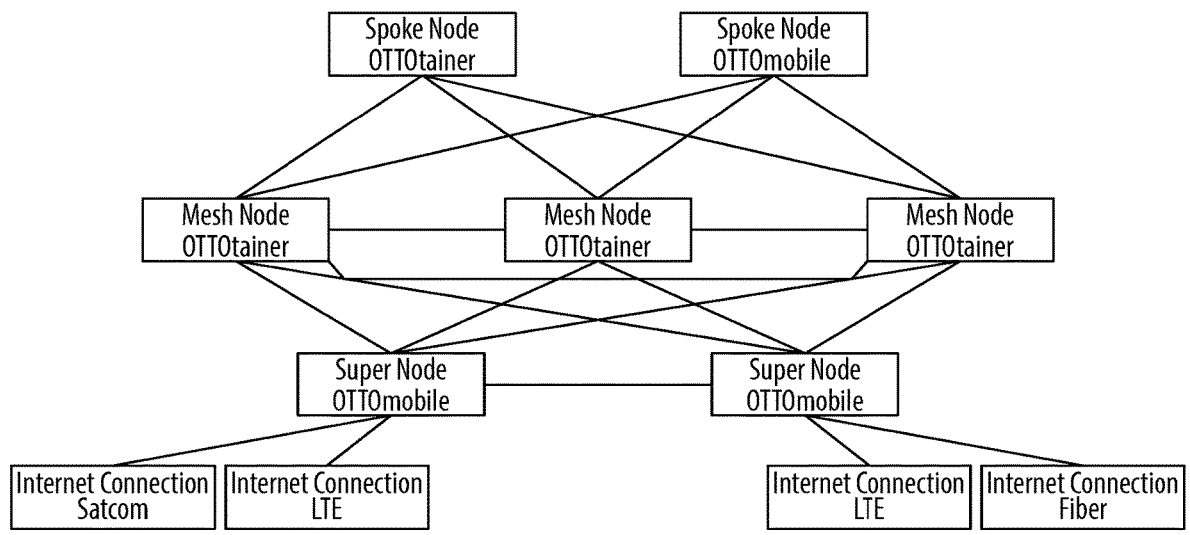
FIG. 3 shows an exemplary distributed point of presence network incorporating embodiments of the present disclosure.

FIG. 3 shows an exemplary distributed point of presence network incorporating embodiments of the present disclosure. As shown in FIG. 3, one or more spoke nodes, one or more mesh nodes, one or more super nodes, and various internet connections are in communication via wireless and/or wired connections.

Figure 4:
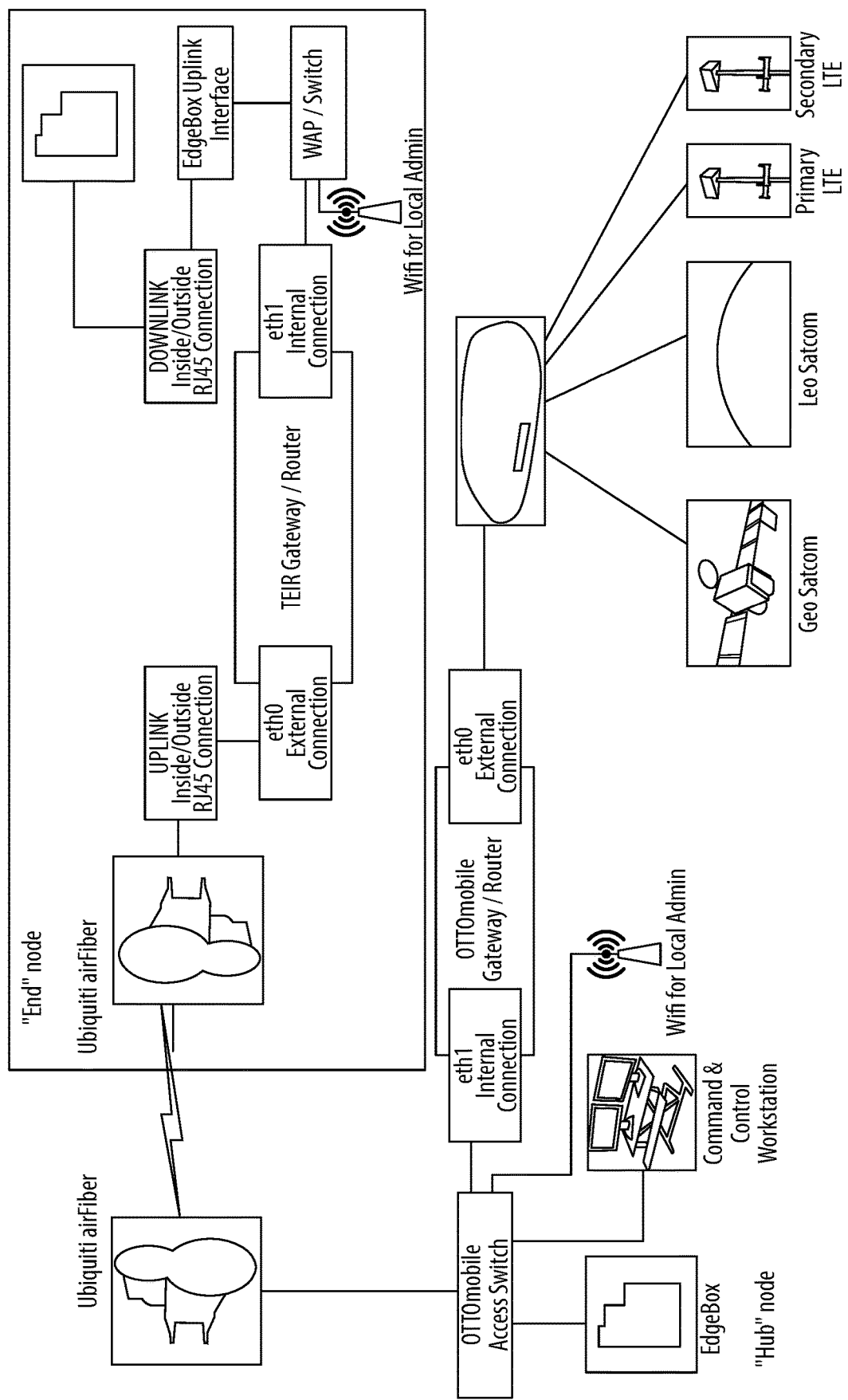
FIG. 4 shows an example of a hub node comprising one or more connections, wireless preferred, to an end node.

FIG. 4 shows an example of a hub node comprising one or more connections, wireless preferred, to an end node. As shown, the end node can be, for example, an ubiquiti air fiber with various uplinks, downlinks, and/or WAP/switches with one or more gateways and/or routers connected. The hub node may be any suitable computing element or elements which may comprise one or more servers. As shown in FIG.

4, an exemplary immersion cooling system, a command and control workstation, and WI-FI connection can comprise the hub node. In some examples, one or more external connections may be provided such as, but not limited to, one or more satellite communications and/or one or more LTE communications.

Benefits of the Exemplary Embodiments

The need for high capacity computing resources in places where it was never before anticipated is increasing. The ability to provide on-site, on-demand computing resources, and the ability to interconnect those computing resources with each other and the broader Internet, or user operated networks, can be important to enabling true computing.

There is not a commercially available system which incorporates all aspects of a data center (power generation, heat rejection, monitoring, management, etc.) and the underlying computing architecture included therein with the communications interconnectivity technology re-queued to facilitate the meaningful use of the computing resources provided by the systems therein. Traditionally, the deployment of these types of resources would be tied to a fixed location within a permanent structure. The communication systems for these fixed structures would likely be standard fiberoptic, which require time and resources to deploy and maintain.

The deployment of computing resources where they are newly needed is a time consuming and resources intensive process. It is certainly not possible to dynamically respond to demand. The operation of traditional facilities is costly and time consuming. Without a standard means of interconnecting, packaging, and deploying these kind of technologies in a rapid and repeatable fashion and which ultimately provide a common set of capabilities to operators and end users, the deployment of next generation edge-centric technologies and services will take substantially longer to complete.

An exemplary distributed computing system incorporates all required compute and communication infrastructure, as well as the systems and services required to monitor, manage, and interconnect them into a packaged form factor with a multitude of embodiments that can be customized to the needs of the user and the application. This system can incorporate a combination of multiple satellite and terrestrial based communication platforms to provide a wide means of connectivity options which are appropriate for a multitude of applications and will meet a wide variety of customer needs.

This exemplary system can be quickly and easily deployed in virtually any environment. There are a multitude of embodiments, including fully mobile, self-propelled embodiments, as well as containerized and packaged solutions which can be deployed in a variety of fixed, semi-fixed or temporary structures, or in some embodiments, can be deployed on their own without a supporting structure in a fixed, semi-fixed or temporary fashion.

The exemplary distributed computing system can include three elements: the computing element, the communications element, and the supporting infrastructure element. Some embodiments of the system may contain additional shared common elements.

What is claimed is:

1. A system comprising:
   an autonomous vehicle comprising:
      a vessel configured to hold thermally conductive, condensable dielectric fluid;
      a computer component configured to be at least partially submerged within the dielectric fluid;
      a fluid circulation system configured to draw the dielectric fluid from a sump area of the vessel, pass the dielectric fluid through a filter and deliver the dielectric fluid to a bath area of the vessel; and
      a heat exchanger configured to maintain a temperature of the fluid;
   wherein the autonomous vehicle is configured to self-drive to a location upon receiving an instruction including coordinates for the location, and
   wherein the autonomous vehicle further comprises a control unit configured to
      detect a network disruption,
      delineate an area affected by the network disruption, and
      drive to a location within the area.

2. The system of claim 1, wherein the autonomous vehicle comprises a generator for providing power to the vessel.

3. The system of claim 1, wherein the autonomous vehicle comprises a transceiver for transmitting and receiving signals generated by the vessel.

4. The system of claim 1, wherein the autonomous vehicle comprises a transceiver for connecting the vessel to a network.

5. The system of claim 1, wherein the control unit is further configured to transmit a signal to a central server indicating the location.

6. The system of claim 5, wherein the control unit is further configured to receive another signal from the central server indicating that the autonomous vehicle is or is not authorized to drive to the location.

7. The system of claim 6, wherein when the another signal indicates that the autonomous vehicle is not authorized to drive to the location, the control unit is configured to determine another location within the area.

8. The system of claim 1, wherein the control unit determines the location based on a machine learning algorithm.

9. The system of claim 8, wherein the machine learning algorithm is trained using data from past locations determined by the autonomous vehicle and other vehicles.

\* \* \* \* \*